UNITED STATES PATENT OFFICE.

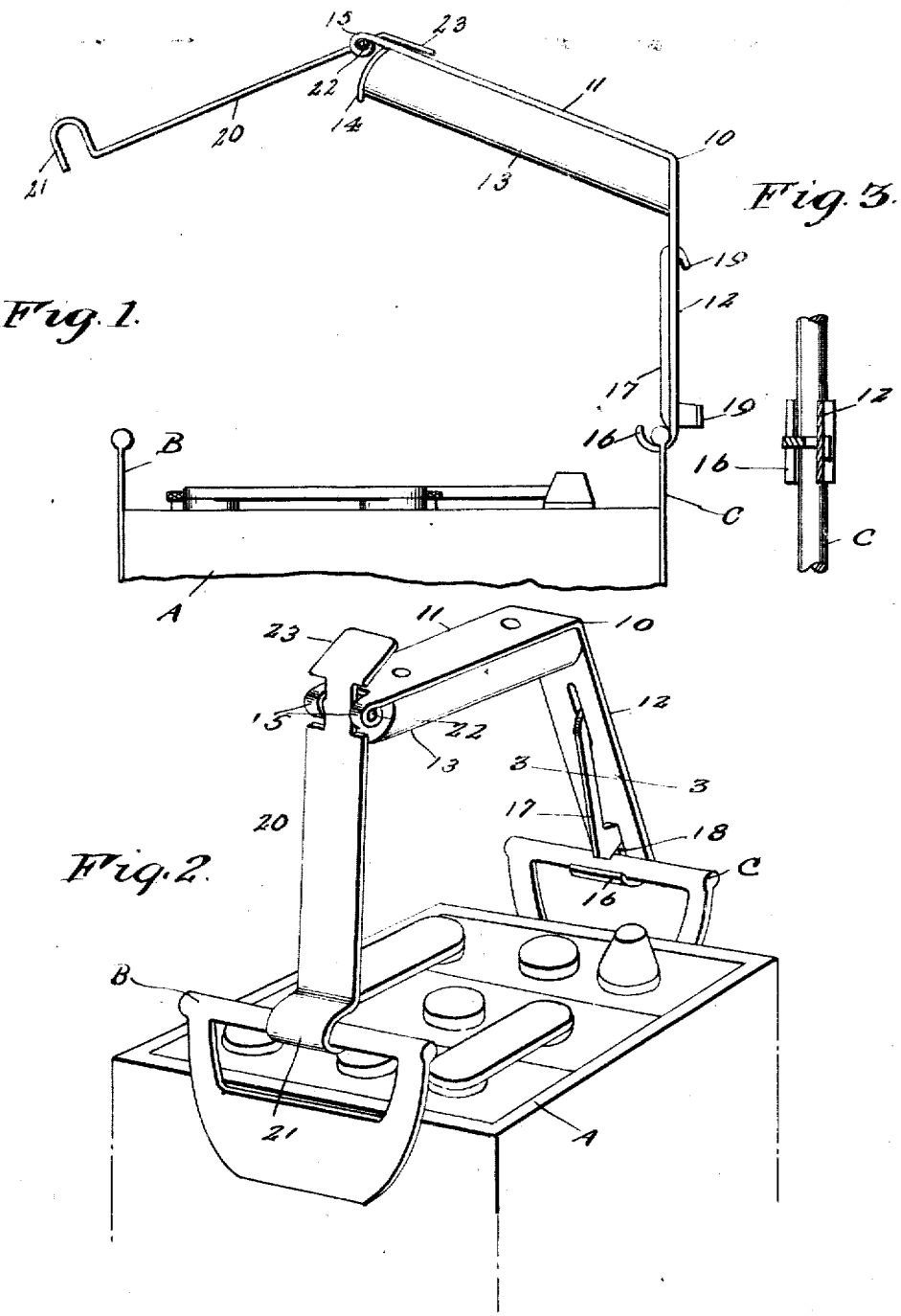

JOHN A. KIMBALL, OF TAYLORVILLE, ILLINOIS.

HANDLE FOR BATTERY-BOXES.

1,355,050.　　　　　Specification of Letters Patent.　　Patented Oct. 5, 1920.

Application filed May 17, 1920. Serial No. 381,968.

*To all whom it may concern:*

Be it known that I, JOHN A. KIMBALL, a citizen of the United States of America, residing at Taylorville, in the county of Christian and State of Illinois, have invented new and useful Improvements in Handles for Battery-Boxes, of which the following is a specification.

This invention relates to carrying devices for storage batteries and has for its object the provision of a handle adapted to be retained by the mechanics of a battery service station and which is so formed that it may be quickly and easily engaged with the handle loops commonly provided on storage batteries and which is for the purpose of permitting easy handling of storage batteries, the device being particularly meritorious in view of the fact that storage batteries are heavy and are not easily capable of handling by the ordinary means provided thereon.

An important object is the provision of a handle of this character which includes a fixed arm engageable upon the handle loop at one end of the storage battery and which includes a pivoted arm engageable with the loop at the other end of the storage battery, this movable arm being controlled by the operator's thumb.

A further object is the provision of a handle of this character which is provided with an automatically operating safety catch which will positively prevent disengagement of the fixed arm of the handle from the loop at one end of the storage battery, this safety catch automatically and gravitationally swinging into inoperative position when the handle is tilted at the time of its final engagement with the loop at one end of the battery box.

An additional object is the provision of a device of this character which will be extremely simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which Figure 1 is a side elevation of a battery box showing my handle applied thereto and in its initial position, Fig. 2 is a perspective view thereof showing the handle in fully engaged position, and Fig. 3 is a cross sectional view on the line 3—3 of Fig. 2.

Referring more particularly to the drawings, the letter A designates a battery box and B and C designate the handle loops carried thereby.

In carrying out my invention I provide a handle structure which includes a bar 10 formed of obtuse angular shape and which includes a handle portion 11 and an arm 12 extending at an obtuse angle thereto. Secured to the handle portion 11 is a preferably round wooden bar 13 which serves as a handle proper and the terminal of the handle portion 11 at the end of this bar 13 is cut to form a tongue 14 bent around one end of the bar 13 and bent at the sides of the tongue to form loops or eyes 15. The free end of the arm 12 is formed with a hook 16 which is engageable with either of the loops B or C on the battery box. Pivotally connected with this arm 12 is a catch 17 which has its end portion immediately above the hook 16 slidable through a slot 18 in the arm 12 and formed with flanges 19 limiting the movement of the catch.

Disposed at the end of the bar 13 opposite the arm 12 is a movable arm 20 which has its free end formed as a hook 21 engageable with the other loop on the battery box. This arm 20 is formed on opposite sides with lugs 22 rotatably engaged within the loops 15 and the upper terminal of the arm 20 is formed with a thumb engaging piece 23 engageable by the thumb of an operator when grasping the handle bar 13 so that the arm 20 may be swung as desired.

In the use of the device the operator grasps the handle by holding the handle portion 11 of the bar 10 and the bar 13 within his hand with his thumb engaging and depressing the thumb piece 23 to bring the latter into engagement with the top of the bar 13. When this is done the device is so held that the catch 17 will gravitate against the arm 12, as clearly shown in Fig. 1. The hook 16 on the free end of the arm 12 is then engaged with either of the loops B or C on the battery box, after which the operator swings the handle upon this hook as a pivot and engages the hook 21 of the arm 20 upon the other loop B or C of the battery box, at which time the operator releases his pressure upon the thumb piece 23 and subsequently inserts his thumb between this thumb piece and the bar 13 so as to hold the arm 20 against movement. When this is done the angular inclination of the arm 20 will result in gravitational movement of the catch 17 into the position shown in Fig. 2 with this catch member extending over the loop engaged by the arm 20 and coöperating with the hook 16 to prevent disengagement of the arm 12 from the loop B or C. When the operator's hand is subsequently removed my handle structure will be maintained in upright position upon the battery box ready to be grasped at any time that it is desired to move the battery from place to place. It will be apparent that my handle member will not become disengaged from the battery box until the operator depresses the thumb piece 23 to swing the arm 20 and hook 21 out of engagement with the loop B or C at the opposite end to that engaged by the hook 16.

From the foregoing description and a study of the drawings it will thus be apparent that I have provided a simply constructed and consequently inexpensive handle which may be quickly and easily engaged with the loops ordinarily provided on a battery box and which is so formed that the box may be easily transported from place to place without any danger of dropping it.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A handle for battery boxes provided at their ends with handle loops comprising a bar formed in obtuse angular form to define a handle portion and an arm, a wooden handle-bar proper secured to the handle portion of said bar, a hook formed on the free end of said arm and engageable with one of the loops at the ends of a battery box, and an arm pivoted upon the other end of said bar and having one end formed as a hook engageable with the loop at the other end of the battery box and having its other end formed with a thumb piece engageable by the thumb of the operator whereby said last named arm may be swung.

2. A handle for battery boxes provided at their ends with handle loops comprising a bar formed in obtuse angular form to define a handle portion and an arm, a wooden handle-bar proper secured to the handle portion of said bar, a hook formed on the free end of said arm and engageable with one of the loops at the ends of a battery box, and an arm pivoted upon the other end of said bar and having one end formed as a hook engageable with the loop at the other end of the battery box and having its other end formed with a thumb piece engageable by the thumb of the operator whereby said last named arm may be swung, and an automatically operating safety catch mounted upon said first named arm and coöperating with the handle loop engaged by the hook thereon whereby to prevent disengagement of said first named arm from the engaged loop.

3. A handle for battery boxes provided at their ends with handle loops, comprising a bar formed in obtuse angular form to define a handle portion and an arm, a wooden handle-bar proper secured to the handle portion of said bar, a hook formed on the free end of said arm and engageable with one of the loops at the ends of a battery box, an arm pivoted upon the other end of said bar and having one end formed as a hook engageable with a loop at the other end of the battery box and having its other end formed with a thumb piece engageable by the thumb of an operator whereby said last named arm may be swung, and an automatically operating safety catch mounted upon said first named arm and coöperating with the handle loop engaged by the hook thereon whereby to prevent disengagement of said first named arm from the engaged loop, said safety catch comprising a bar member pivoted upon the first named arm and having a lateral extension slidable through a slot in the first named arm immediately above the hook thereon, said extension being formed with retaining flanges limiting movement of said catch.

In testimony whereof I affix my signature.

JOHN A. KIMBALL.